United States Patent [19]

Nitta

[11] Patent Number: 4,690,377
[45] Date of Patent: Sep. 1, 1987

[54] HIGH-PRESSURE GAS FILLING VALVE FOR USE IN A PRESSURE RESISTANT CONTAINER

[75] Inventor: Tomio Nitta, Yokohama, Japan

[73] Assignee: Tokai Corporation, Kanagawa, Japan

[21] Appl. No.: 947,444

[22] Filed: Dec. 29, 1986

[30] Foreign Application Priority Data

Mar. 18, 1986 [JP] Japan .......................... 61-38341[U]

[51] Int. Cl.⁴ .......................................... F16K 31/00
[52] U.S. Cl. ..................................... 251/354; 141/18; 141/294; 141/348; 141/354
[58] Field of Search ............... 141/2, 59, 293, 294, 141/295, 296, 348, 354; 251/149.7, 353, 354

[56] References Cited

U.S. PATENT DOCUMENTS

| | | | |
|---|---|---|---|
| 3,044,504 | 7/1962 | Iketani | 141/18 |
| 3,044,505 | 7/1962 | Iketani | 141/18 |
| 4,077,429 | 3/1978 | Kimball | 141/348 |

FOREIGN PATENT DOCUMENTS

| | | | |
|---|---|---|---|
| 1459633 | 10/1966 | France | 141/326 |
| 1041763 | 7/1966 | United Kingdom | 141/348 |

*Primary Examiner*—A Michael Chambers
*Attorney, Agent, or Firm*—Armstrong, Nikaido, Marmelstein & Kubovcik

[57] ABSTRACT

Disclosed is a valve for use in a pressure-resistant container, permitting the full filling of the container with a liquefied gas thanks to a well controlled gas depletion path. The opening and closing of the depletion path is effected by bringing two opposing contact members apart and close to each other whereas the flow rate of gas depletion depends on the roughness of the contact surface areas of the opposing member. Such an appropriate depletion path can be made without difficulty such as encountered with formation of depletion path with recourse to machining.

1 Claim, 2 Drawing Figures

U.S. Patent   Sep. 1, 1987   4,690,377
FIG. 1
FIG. 2
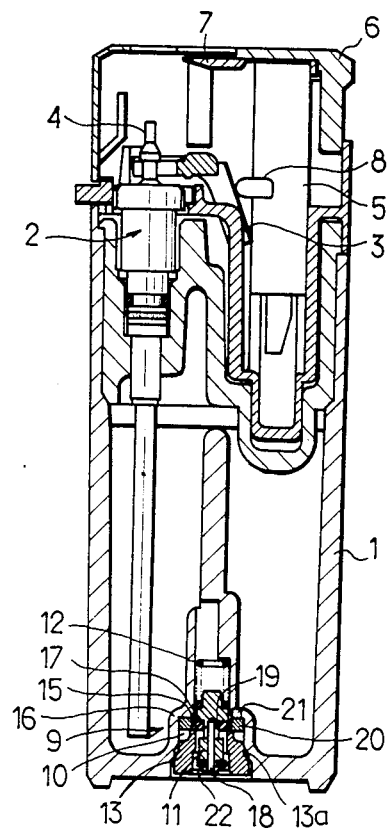
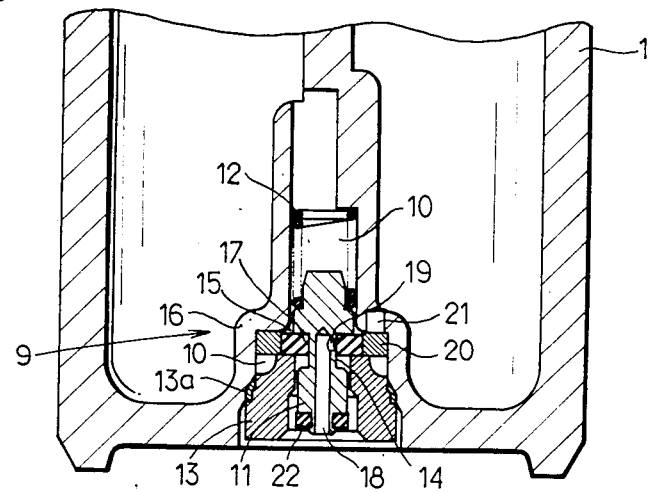

HIGH-PRESSURE GAS FILLING VALVE FOR USE IN A PRESSURE RESISTANT CONTAINER

The present invention relates to a valve for use in filling a pressure resistant container with gas at an increased pressure.

As for a pressure resistant container equipped with a gas filling valve as used in a gas lighter there are two kinds of gas filling valves, one having a gas depletion path provided therein, and the other having no gas depletion path.

As for a conventional gas filling valve having no depletion path, in filling the pressure resistant container with a gas through an associated valve the inner pressure of the pressure resistant container is easy to rise until it balances with the inner pressure of a gas bomb from which the gas is supplied. As a result the pressure resistant container cannot be filled with as much gas as required.

As for a conventional gas filling valve having a depletion path provided therein, if the size of depletion path is somewhat larger than the one required, the liquefied gas is most likely to boil and overflow from the depletion path immediately after injection to the pressure resistant container. As a result the gas lighter cannot be filled with as much gas as required. The size of cross-section of depletion path which is appropriate for the purpose of assuring depletion of as much gas as required for preventing the boiling of the liquefied gas in the pressure resistant container, thereby allowing the gas lighter to be filled with the gas well is so small that the precise formation of such appropriate depletion path is difficult with recourse to machining.

The object of the present invention is to provide a high-pressure gas filling valve structure which makes it easy to form an appropriate size of depletion path, positively preventing gas leakage and intrusion of dust particles to sealed portions in a pressure resistant container.

To attain the object a high-pressure gas filling valve for use in a pressure resistant container according to the present invention comprises:

a reentrant valve chamber opening to the atmosphere at one end thereof and communicating with the inside space of the pressure resistant container at the other end of the valve chamber;

a slidable valve body put in the valve chamber, the valve body having a neck of reduced diameter, a gas injection path opening to the atmosphere and extending short of the top of the valve body along the longitudinal central axis thereof, and valve outlet radially branching from the longitudinal gas injection path;

a spring means for pushing the slidable valve body towards the opening end of the valve chamber;

a valve fitting fixed to the valve chamber, accommodating the slidable valve body in the center hole of the valve fitting;

an annular seat integrally connected to and inwardly projecting from the inner wall of the valve chamber in opposing relation to the top end of the valve fitting, leaving a given space therebetween; and a seal ring of an elastic material slidably fitted around the neck of the valve body, the seal ring being movable between the annular seat and the top end of the valve fitting in said given space, and being pushed against the top end of the valve fitting under the influence of the spring means in the stand-by position, the valve body being normally in the stand-by position in which its valve outlet is closed by the inner peripheral surface of the seal ring, and the valve outlet being brought above the seal ring in the gas-filling position in which the slidable valve body is pushed upward against the spring means; and is characterized in that said high-pressure gas filling valve further comprises:

a control ring sandwiched between the top end of the valve fitting and the annular seat, encircling the seal ring in the valve chamber; and a gas depletion path extending from the place at which the top surface of the control ring is in contact with the annular seat to the atmosphere through the space between the control ring and the inner wall of the valve chamber and the space between the control ring and the top end of the valve fitting.

Such gas depletion path effectively controls the discharge of gas by means of the space existing in the opposing contact areas of the outer peripheral surface of the control ring and the inner wall of the valve chamber and the space existing in the opposing contact areas of the lower surface of the control ring and the top end of the valve fitting. The flow rate at which the gas is allowed to escape can be controlled by controlling the roughness of the contact areas of the opposing members and by controlling the pressure with which the control ring is pushed against the inner wall of the valve chamber and the valve fitting.

·Such gas depletion path appropriate for the purpose is easy to be formed, compared with the one which is formed with recourse to machining.

The invention will now be further explained with reference to preferred embodiment shown in the drawings, wherein:

FIG. 1 is a longitudinal section of a gas lighter equipped with a high-pressure gas filling valve according to the present invention; and FIG. 2 is an enlarged longitudinal section of a part of the gas lighter in which the gas filling valve is fixed.

As shown in the drawings, a pressure resistant container 1 has a flame valve 2 provided at the top of the gas storage. The actuation of a gas lever 3 will cause ejection of gas from a flame nozzle 4. Also, at the top of the gas storage 1 a piezoelectric element 5 is positioned next to the flame valve 2. When the thumb-operated cap 6 is pushed down, the piezoelectric element 5 is subjected to compression to generate electricity at so high a voltage that an electric discharge appears between the discharge electrode 7 and the counter electrode of nozzle 4, thereby causing ignition. As shown in FIG. 1, a lever-push 8 is fixed to the side of the piezoelectric element 5 for pushing the gas lever 3 in the course of descent of the piezoelectric element.

A high-pressure gas filling valve 9 is mounted at the bottom of the gas container 1. The gas filling valve 9 has a valve chamber 10 in the reentrant form of the bottom of the storage housing 1. The reentrant valve chamber opens to the atmosphere at one end thereof, and it communicates with the inside space of the gas storage 1 at the other end or ceiling of the chamber. A slidable valve body 11 is put in the valve chamber 10. It can move freely in the direction of longitudinal central axis. Normally, the slidable valve body 11 is pushed towards the open end of the valve chamber 10 under the influence of a spring 12. A valve fitting 13 is threadedly engaged or welded to the open end of the valve chamber 10, as indicated at 13a.

The valve fitting 13 accommodates the slidable valve body 11, permitting the longitudinal displacement thereof. The slidable valve body 11 has a neck of reduced diameter 14 formed therearound. An annular seat 16 is integrally connected to and inwardly projects from the inner wall of the valve chamber in opposing relation to the top end of the valve fitting, leaving a given space 15 therebetween. A seal ring 17 of an elastic material such as rubber is fitted around the neck 14 of the slidable valve body 11. The seal ring 17 can move longitudinally between the top end of the valve fitting 13 and the annular seat 16 of the valve chamber, and in the stand-by position the seal ring 17 is pushed against the top end of the valve fitting 13 under the influence of the spring 12. The slidable valve body 11 has a gas injection path 18 opening to the atmosphere and extending short of the top of the valve body along the longitudinal central axis thereof and valve outlet 19 radially branching from the longitudinal gas injection path 18. In the stand-by position the valve outlet 19 is closed by the inner peripheral surface of the seal ring 17, and the valve outlet 19 is brought above the seal ring 17 in the gas-filling position in which the slidable valve body 11 is pushed upward against the influence of the spring 12. A control ring 20 is sandwiched between the top end of the valve fitting 13 and the annular seat 16, and the inner peripheral surface of the control ring 20 is put tightly on the outer peripheral surface of the seal ring 17. In the valve chamber 10 a gas depletion path 21 opens to the inside space of the pressure resistant container 1 at the place at which the upper surface of the control ring 20 is brought in contact with the annular seat projection 16, extending therefrom to the atmosphere through the space existing between the outer peripheral surface of the control ring 20 and the inner wall of the valve chamber 10 and the space between the lower surface of the control ring 20 and the top end of the valve fitting 13. The gas depletion path is normally closed because the seal ring 17 is pushed tightly against the top end of the valve fitting 13. A rubber seat is designated at 22.

In the stand-by position as shown in the drawings, the valve outlet 19 of the slidable valve body 11 is closed by the seal ring 17, and at the same time, the gas depletion path 21 is closed at the place at which the seal ring 17 is pushed tightly against the top end of the valve fitting 13.

In filling the gas storage 1 with gas, the nozzle of a gas bomb is pushed against the rubber seat 22 of the slidable valve body 11, thereby pushing the valve body 11 inward. Then, the valve outlet 19 is raised above the seal ring 17, so that the valve outet 19 opens to the valve chamber 10, communicating with the inside space of the pressure resistant container 1. Thus starting the filling of the container with gas. Then, the seal ring 17 is pushed upward by the shoulder at each side of the neck of the slidable valve body 11 until the seal ring 17 is displaced from the top end of the valve fitting 13 to the annular seat projection 16, thus causing the gas depletion path 21 to open to the atmosphere, and permitting the controlled depletion of gas from the inside space of the pressure resistant container to the atmosphere. Thus, the situation in which the gas pressure build up in the pressure resistant container balances with the inner pressure of the gas bomb to prevent the full filling of the container with gas is avoided, and the complete gas filling is assured. The closing and opening of the depletion path is performed by pushing the seal ring 17 against the top end of the valve fitting and taking the same off from the top end of the valve fitting 13 respectively whereas the flow rate at which gas is depleted is controlled by the surface roughness of the opposing contact areas of the top end of the valve fitting 13 and the lower surface of the control ring 20.

As is understood from the above, in a high-pressure gas filling valve for use in a pressure resistant container according to the present invention the closing and opening of the depletion path is effected by putting the seal ring on the top end of the valve fitting and taking the same off therefrom respectively whereas the flow rate of depletion is controlled by the surface roughness of the opposing contact areas of the valve fitting and the control ring. Such depletion path appropriate for the purpose can be formed without such difficulty as encountered in forming a depletion path with recourse to machining.

A high-pressure gas filling valve according to the present invention is described above as being applied to a gas lighter, but it can be equally applied to any other pressure resistant container for assuring that the container is filled with gas well.

I claim:

1. A gas filling valve for use in a pressure resistant container comprising:
    a reentrant valve chamber opening to the atmosphere at one end thereof and communicating with the inside space of the pressure resistant container at the other end of said valve chamber;
    a slidable valve body put in the valve chamber, said valve body having a neck or reduced diameter, a gas injection path opening to the atmosphere and extending short of the top of the valve body along the longitudinal central axis thereof, and valve outlet radially branching from the longitudinal gas injection path;
    a spring means for pushing the slidable valve body towards the open end of the valve chamber;
    a valve fitting fixed to the valve chamber, accommodating said slidable valve body in the center hole or the valve fitting;
    an annular seat integrally connected to and inwardly projecting from the top perimeter of the valve chamber wall in opposing relation to the top end of the valve fitting, leaving a given space therebetween; and
    a seal ring of an elastic material slidably fitted around the neck of the valve body, said seal ring being movable between the annular seat and the top end of the valve fitting in said given space, and being pushed against the top end of the valve fitting under the influence of said spring means in the stand-by position, said valve body being normally in the stand-by position in which its valve outlet is closed by the inner peripheral surface of said seal ring, and the valve outlet being brought above said seal ring in the gas-filling position in which said slidable valve body is pushed upward against said spring means; characterized in that said gas filling valve further comprises:
    a control ring sandwiched between the top end of said valve fitting and said annular seat, encircling said seal ring in said valve chamber; and
    gas depletion path extending from the place at which the top surface of said control ring is in contact with said annular seat to the atmosphere through the space between said control ring and the inner wall of said valve chamber and the space between said control ring and the top end of said valve fitting.

* * * * *